No. 668,698. Patented Feb. 26, 1901.
A. D. WAYMOTH.
WOOD TURNING LATHE.
(Application filed Mar. 7, 1898.)
(No Model.)

Witnesses.
W. J. Baldwin
E. M. Healy

Inventor.
A. D. Waymoth
By
Southgate & Southgate
Attorneys.

THE NORRIS PETERS CO., PHOTO-LITHO., WASHINGTON, D. C.

UNITED STATES PATENT OFFICE.

AUGUSTINE D. WAYMOTH, OF FITCHBURG, MASSACHUSETTS.

WOOD-TURNING LATHE.

SPECIFICATION forming part of Letters Patent No. 668,698, dated February 26, 1901.

Application filed March 7, 1898. Serial No. 672,814. (No model.)

*To all whom it may concern:*

Be it known that I, AUGUSTINE D. WAY-MOTH, a citizen of the United States, residing at Fitchburg, in the county of Worcester and State of Massachusetts, have invented a new and useful Wood-Turning Lathe, of which the following is a specification.

My invention relates to that class of wood-turning lathes which are ordinarily employed for turning ornamental patterns—such, for example, as are employed for chair-rounds and similar locations—and which employ substantially annular shaping-cutters.

My invention has been especially designed as an improvement upon the Waymoth wood-turning lathe, which is a machine well known to the trade.

The especial object of my present invention is to provide an adjustable support for the annular shaping-cutters, so that shaping-cutters of different diameters for producing various patterns can be employed, and means will be provided for producing a relative adjustment of the shaping-cutter and the roughing-cutter, so that the cutting-points of the various shaping-cutters can be kept close to the roughing-out tool and the least possible amount of stock will be wasted.

A further object of my invention is to provide an improved construction for more firmly holding the movable carriage down upon its ways on the bed.

To these ends my invention consists of the parts and combinations of parts, as hereinafter described, and more particularly pointed out in the claim at the end of this specification.

Figure 1:
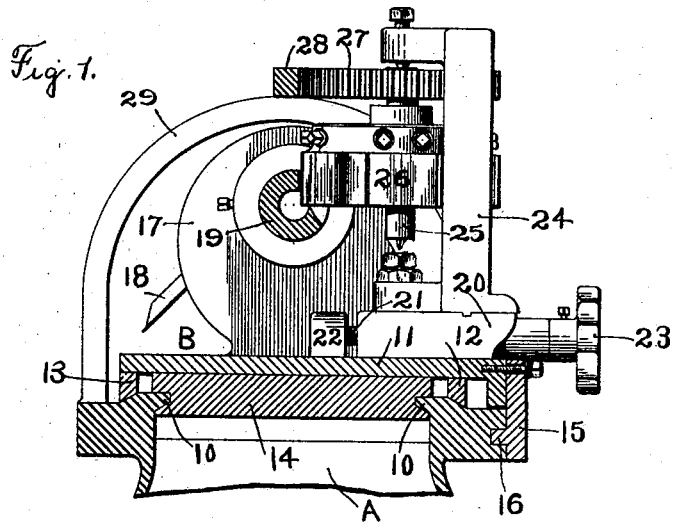
Figure 2:
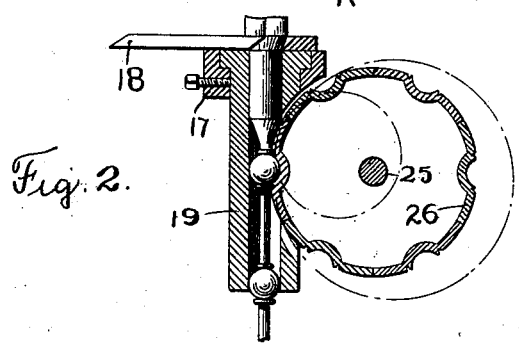
Figure 3:
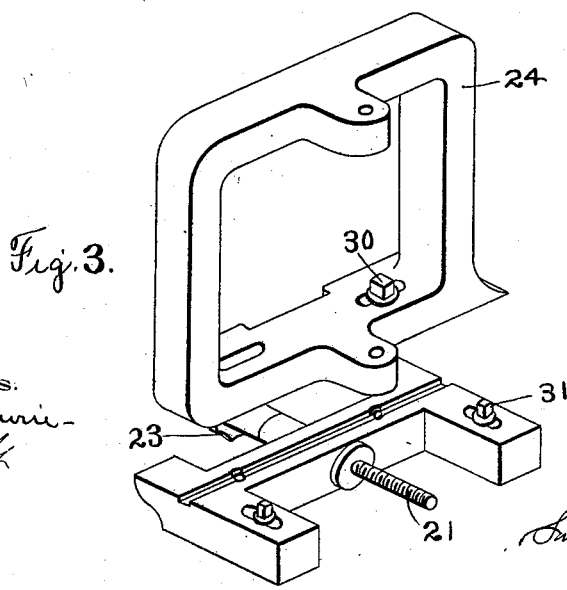

In the accompanying drawings, Figure 1 is a partial transverse sectional view of a wood-turning lathe constructed according to my invention. Fig. 2 is a sectional plan view of the same, and Fig. 3 is a perspective view illustrating the adjustable frames for carrying an annular shaping-cutter.

In that class of lathes to which my invention relates the cutting pressure pushing rearwardly on the lower edge of the annular shaping-cutter has a tendency to cause the front side of the movable carriage to rise from the ways. To overcome this tendency and to provide simple and efficient means for taking up the wear on the ways, I preferably provide a downwardly-extending plate which is adjustably fastened to the rear side of the carriage and is provided along its inner side with an inwardly-extending arm for fitting into a groove in the bed of the lathe to firmly hold the carriage down on its ways. The bolt-holes for receiving the bolts which fasten this piece to the rear side of the carriage are slightly slotted, so that the said piece can be slightly adjusted up and down to take up wear, if desired.

The annular shaping-cutters are journaled in a frame, which is mounted on the carriage so that it can be adjusted both transversely and longitudinally with respect thereto to accommodate different shapes of annular cutters and to bring the cutting-point of each cutter as close to the roughing-tool as practicable, so that the same may be employed to produce the least possible waste of stock.

Referring to the drawings and in detail, A designates the bed of a wood-turning lathe, and B the movable carriage thereon. The bed A is provided on its upper surface with overhanging ways 10. The carriage B comprises an upper plate 11, having downwardly-extending strips 12 and 13, which may or may not be formed integrally with the plate 11, as desired, for engaging the upper surface of the overhanging ways 10, and a secondary or lower plate 14, which is provided with grooves in its edges for engaging the overhanging ways 10.

Adjustably bolted onto the rear edge of the carriage B is a downwardly-extending plate 15, having an inwardly-extending lip or elbow 16, fitting into a slot in the bed A to hold the carriage B firmly down upon its ways.

A supporting-plate 17 is formed integrally or extends up from the carriage-plate 11, and mounted in said plate 17 is a roughing-tool 18 and a work-supporting ring or tube 19, which is cut away or slotted on its rear side, as shown in Figs. 1 and 2, to leave room for an annular shaping-cutter to engage the stock being acted upon.

A primary frame 20 is mounted on the carriage B and is adjustable transversely with respect thereto by means of a screw 21, which is threaded into a boss 22 and has a handle 23 secured at its opposite end. The primary frame 20 can be clamped in its adjusted position by means of bolts 31, as shown in Fig. 3.

Mounted on the primary frame 20 and adjustable longitudinally with respect thereto is a frame 24 for supporting the annular shaping-cutter. The frame 24 can be clamped in its adjusted position by means of bolts 30, as shown in Fig. 3. Journaled in the frame 24 is a vertical shaft 25.

The shaping-cutter 26 is removably secured on the vertical shaft 25 and preferably comprises a plurality of knives or sections, which are removably secured in place by bolts, so that said sections can be taken out to be ground or sharpened when desired.

Secured on the vertical shaft 25 above the cutter 26 is a pinion 27, the pitch diameter of which is substantially equal to the diameter of the annular shaping-cutter. The pinion 27 fits into or meshes with a rack 28, carried by arch-pieces 29, extending up from the bed A.

The operation of a wood-turning lathe as thus constructed is most clearly illustrated in Fig. 2. As shown in this figure, when the carriage B is moved along on its bed A—as, for example, by the ordinary lever-and-link construction, which need not be herein shown or described—the roughing-tool 18 will first reduce the stock to substantially a cylindrical shape, and the annular shaping-cutter 26, which will be turned by means of the pinion 27 and stationary rack 28, will then operate to produce the desired pattern or shape.

By adjusting the hand-wheel 23 the machine may be set to accommodate annular shaping-cutters of different diameters and the depth of the cut may be regulated, while by adjusting the cutter-supporting frame 24 longitudinally thereon the cutting-point of each cutter can be kept as close to the roughing-tool as possible, and this I have found to be an exceedingly-important point in practice, as it not only permits me to set various forms of cutters so that they will produce the least possible waste of stock and will turn complete patterns along as much of the length of the stick or stock being operated upon as is possible, but by means of this adjustment I am also enabled to keep the cutting-point of each annular cutter as close to the supporting-plate 17 as practicable, so that the various cutters will operate at the point where the stock is most rigidly supported.

I am aware that changes may be made in the construction of wood-turning lathes by those who are skilled in the art without departing from the scope of my invention as expressed in the claim. I do not wish, therefore, to be limited to the specific forms which I have shown and described; but What I do claim, and desire to secure by Letters Patent of the United States, is—

In a wood-turning lathe, the combination of a bed A having inwardly-extending, overhanging ways 10, a carriage B having a supporting-plate 17 carrying a roughing-tool 18 and a slotted, work-supporting ring 19, a primary frame 20, a screw 21 for adjusting the frame 20 transversely on said carriage, a frame 24 longitudinally adjustable on the primary frame 20, an annular shaping-cutter 26 journaled in the frame 24, and an L-shaped piece 15 adjustably bolted to the rear edge of the carriage B to hold said carriage down on its ways, substantially as described.

In testimony whereof I have hereunto set my hand in the presence of two subscribing witnesses.

AUGUSTINE D. WAYMOTH.

Witnesses:
B. C. GROMMON,
C. H. WAYMOTH.